(12) United States Patent
Lee

(10) Patent No.: US 7,054,046 B2
(45) Date of Patent: May 30, 2006

(54) OPTICAL SCANNING FREQUENCY DOUBLING METHOD AND APPARATUS ADOPTING THE SAME

(75) Inventor: Ju-hyun Lee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 15 days.

(21) Appl. No.: 10/870,162

(22) Filed: Jun. 18, 2004

(65) Prior Publication Data

US 2004/0257631 A1     Dec. 23, 2004

(30) Foreign Application Priority Data

Jun. 19, 2003  (KR)  .................... 10-2003-0039884

(51) Int. Cl.
*G02B 26/08*     (2006.01)
(52) U.S. Cl. .................... 359/213; 359/212; 359/214; 359/900; 359/234; 347/260; 347/261
(58) Field of Classification Search ........ 359/212–214, 359/900, 234, 221, 226; 347/260–261
See application file for complete search history.

(56) References Cited

U.S. PATENT DOCUMENTS

| 5,202,784 A | * | 4/1993 | Reddersen | .................. 359/196 |
| 5,559,319 A | * | 9/1996 | Peng | ..................... 235/462.36 |
| 6,003,998 A | * | 12/1999 | St. Hilaire | .................. 359/859 |
| 6,636,339 B1 | | 10/2003 | Lee | |

* cited by examiner

*Primary Examiner*—Euncha P. Cherry
*Assistant Examiner*—Pranav Khatri
(74) *Attorney, Agent, or Firm*—Buchanan Ingersoll PC

(57) ABSTRACT

An optical scanning frequency doubling method and apparatus adopting the same are provided. According to the method and apparatus, light scanned by a mirror to a predetermined region is fed back to the mirror. The fed back light is output through an output region. Thus, the frequency of a scanner is doubled, thus greatly overcoming difficulties in high-frequency scanning that current scanners employing a separate optical feedback structure have. That is, the apparatus and method optically double the frequency given by the physical structure of the scanner. The doubled frequency is very suitable for laser televisions, and in particular, for high resolution and high quality laser projection-type image display devices.

18 Claims, 8 Drawing Sheets

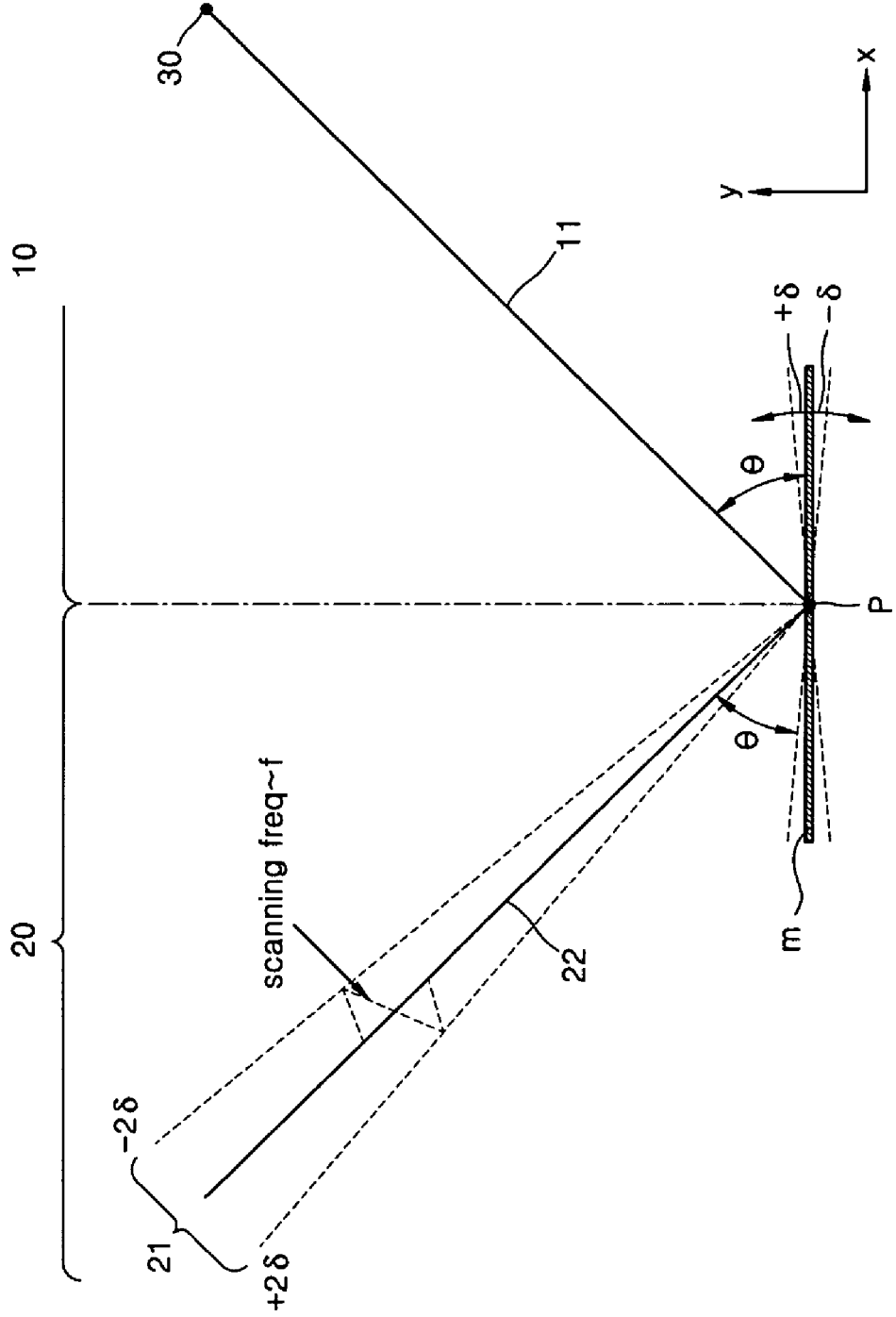

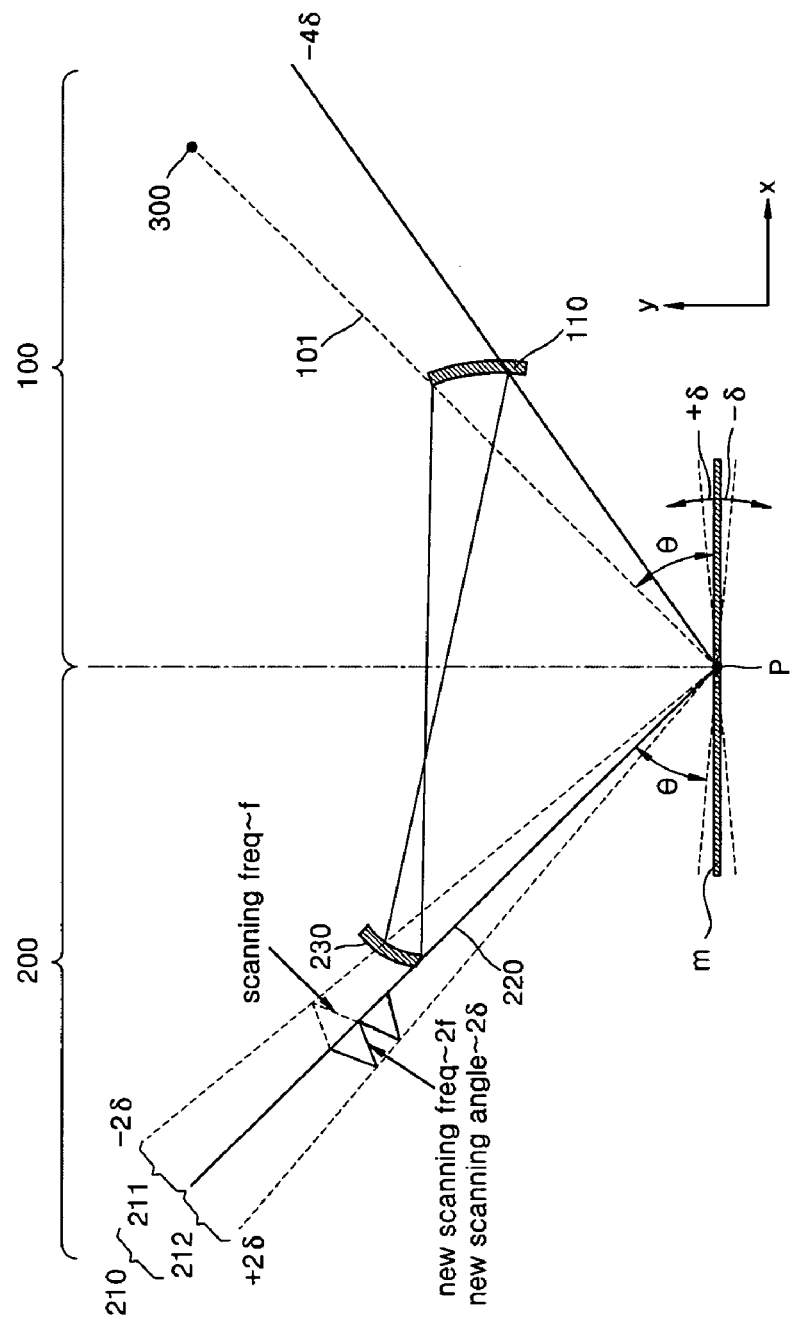

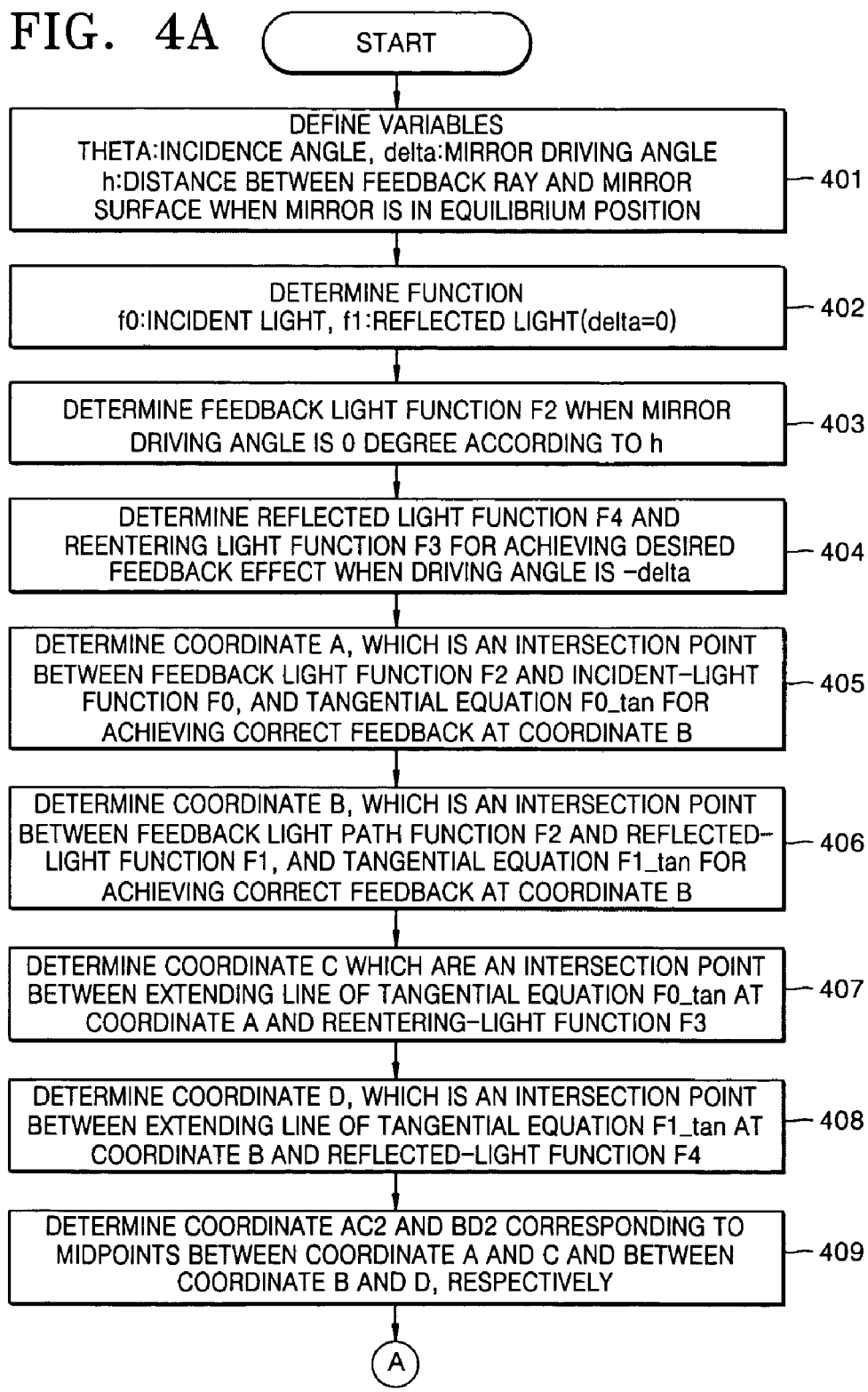

OPTICAL SCANNING FREQUENCY DOUBLING METHOD AND APPARATUS ADOPTING THE SAME

This application claims the priority of Korean Patent Application No. 2003-39884, filed on Jun. 19, 2003, in the Korean Intellectual Property Office, the disclosure of which is incorporated herein in its entirety by reference.

BACKGROUND OF THE INVENTION

1. Field of the Invention

The present invention relates to an optical scanning frequency doubling method and an apparatus adopting the same.

2. Description of the Related Art

As demand for improved multimedia increases, the need for large display screens with high definition also increases. In addition to high resolution, realization of natural color has also become important.

To represent a prefect natural color, it is necessary to use a light source with the same color purity as a laser. One example of a device for realizing such quality is a laser projection system using a scanner.

Among conventional scanning laser projection devices, laser projection systems using a rotating polygon mirror or a galvanometer system are in highest demand. However, optical scanning devices using rotating polygon mirrors or galvanometers are expensive and difficult to miniaturize.

To overcome these disadvantages, next generation laser projection systems under development include a MicroElectro Mechanical Systems (MEMS) scanner. U.S. patent application Ser. No. 09/848,332 discloses a laser projection system using two MEMS scanners that can replace a laser projection system using a rotating polygon mirror or galvanometer.

To apply an MEMS scanner to a large screen-high resolution projection system, it is necessary to provide a sufficient scanning speed and scanning angle. However, various MEMS scanners that have been developed thus far cannot provide these features.

SUMMARY OF THE INVENTION

The present invention provides an optical scanning frequency doubling method capable of optically increasing the scanning rate and apparatus employing the same.

According to an aspect of the present invention, there is provided a method of doubling an optical scanning frequency which includes: disposing a mirror with a reflection point in an equilibrium position such that a line passing through the reflection point and orthogonal to a direction of the mirror in the equilibrium state divides a region into a light incidence area and a light reflection area; emitting light from the light incidence area toward the reflection point of the mirror along a light incidence path at an angle θ to the mirror's equilibrium position; oscillating the mirror about the equilibrium position between angles $-\delta_1$ and $+\delta_2$ at a predetermined frequency and scanning (reflecting) the incident light into a light scanning area of the light reflection area with an angular range corresponding to $\delta_1$ and $\delta_2$, the light scanning area being divided into a feedback scanning region and an output scanning region; feeding the light that enters the feedback scanning region back into the vicinity of the light incidence path of the light incidence area; and reflecting the light fed back into the light incidence area toward the reflection point of the mirror and scanning (reflecting) the reentered light into the output scanning region.

According to another aspect of the present invention, there is provided an apparatus for doubling scanning frequency, which is comprised of a scanning mirror that oscillates from its equilibrium position about a reflection point at a predetermined frequency in an angular range between $-\delta_1$ and $+\delta_2$ with respect to the equilibrium position of the mirror; a feedback mirror that reflects light, which is emitted along a light incidence path at an angle θ and reflected by the reflection point of the mirror into a light feedback region of a light scanning area, toward the vicinity of the light incidence path of the light incidence area; and a reenter mirror that reflects the light reflected by the feedback mirror to the reflection point of the mirror such that the light is scanned onto an output scanning region. Here, the light incidence area and the light reflection area are separated by a line passing through the reflection point and orthogonal to the equilibrium position of the mirror, and the light scanning area is divided into the feedback scanning region and the output scanning region.

BRIEF DESCRIPTION OF THE DRAWINGS

The above objects and advantages of the present invention will become more apparent by describing in detail exemplary embodiments thereof with reference to the attached drawings in which:

FIG. 1 is a ray diagram for explaining a conventional optical scanning device;

FIG. 2 is a ray diagram for explaining a scanning frequency doubling method and apparatus adopting the same according to embodiments of the present invention;

FIGS. 4A–4B are flowcharts illustrating an example of an algorithm for determining an optical design of an optical scanning device according to the present invention;

DETAILED DESCRIPTION OF THE INVENTION

Figure 3A:
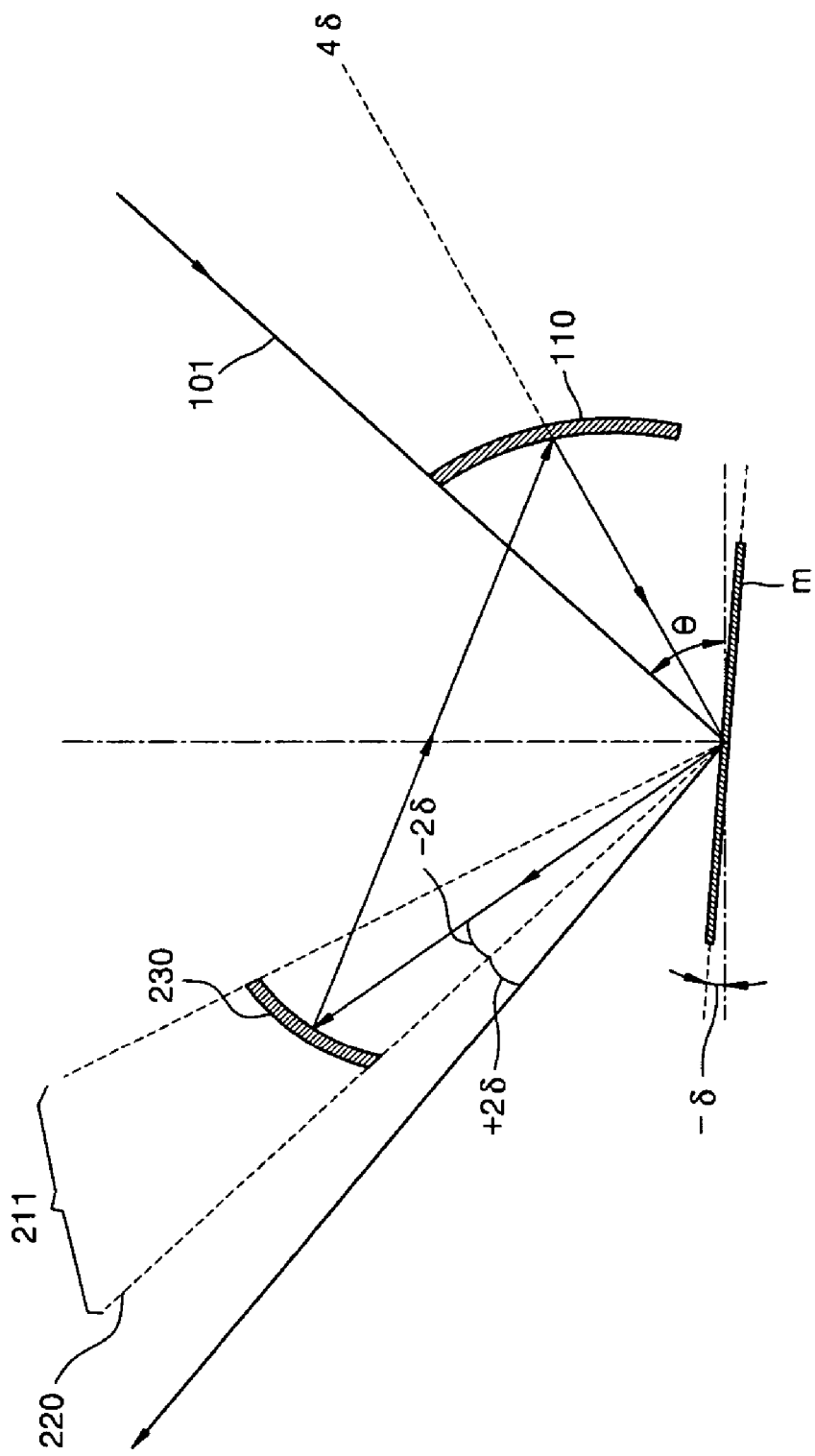
FIGS. 3A and 3B show optical structures that vary depending on the position of a mirror in an optical scanning device according to an embodiment of the present invention.
Figure 3B:
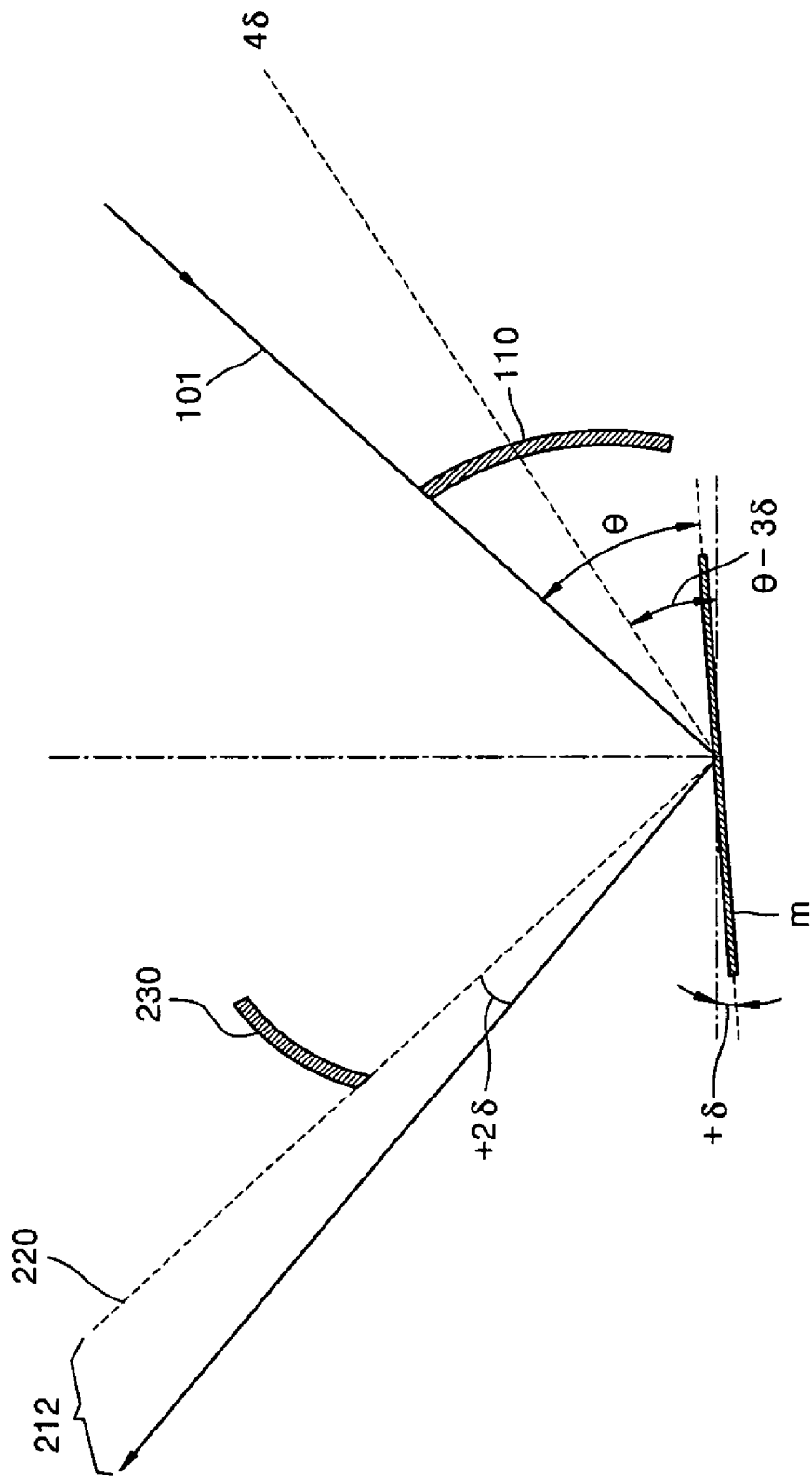

FIG. 2 is a ray diagram for explaining an optical scanning frequency doubling method and apparatus adopting the same according to embodiments of the present invention. FIG. 1 is a ray diagram for explaining a conventional optical scanning device to aid in the understanding of the scanning frequency doubling method and apparatus adopting the same according to the present invention.

Referring to FIG. 1, a mirror m having a reflection point p is disposed parallel to a direction x when in its equilibrium position. In this case, a line passing through the reflection point P in a direction y orthogonal to the direction x divides a region in front of the mirror m into a light incidence area 10 and a light reflection area 20. A light source 30 is placed in the light incidence area 10 and emits light toward the reflection point P of the mirror m along a light incidence path 11 at an angle θ to the direction x.

The mirror m is fixed at the reflection point P and oscillates at a frequency f between angles $-\delta_1$ and $+\delta_2$ about its equilibrium position. Typically, $\delta = \delta_1 = \delta_2$. Mostly the mirror m oscillates between angles −δ and +δ, which is symmetric with respect to the direction x where δ=δ$_1$=δ$_2$. Thus, light emitted from the light source 30 is reflected off the light reflection area 20 toward a light scanning area 21 in an angular range between −2δ and +2δ with respect to a light scanning central axis 22. The angular range corresponds to a rotational angular range of the mirror m. As shown in FIG. 1, the light scanning central axis 22 is a light reflection path when the mirror m is not titled but parallel to the direction x.

The conventional optical scanning device has a scanning angle that is double the angle by which the mirror m deviates from its equilibrium position, and the frequency of the scanned light is the same as the driving frequency f of the mirror m. That is, in the conventional optical scanning device, a light reflection angle ±2δ is twice the angle ±δ by which the mirror m deviates from the equilibrium position, and the frequency of the scanned light is the same as the mirror driving frequency f.

The present invention provides an optical feedback structure, thus doubling the scanning frequency.

Referring to FIG. 2 a mirror m having a reflection point P is disposed in parallel to a direction x when in its equilibrium position. A light source 300 is placed in a light incidence area 100 as defined above and emits light toward the reflection point P of the mirror m along a light incidence path 101 at an angle θ with respect to the direction x when in its equilibrium position, The mirror m is fixed at the reflection point P and oscillates between angles −δ$_1$ and +δ$_2$ about its equilibrium position at a frequency f. As in the conventional art, according to an embodiment of the present invention, δ=δ$_1$=δ$_2$. Thus, light emitted from the light source 300 is reflected off the mirror m into a light scanning area 210 in a light reflection area 200 in an angular range between −2δ and +2δ about a light scanning central axis 220 corresponding to an angular range of the mirror m.

However, in the present invention, the light scanning area 210 is divided into a light feedback region 211 and a light output region 212 separated by the light scanning central axis 220. The light output region 212 allows light reflected off the mirror m to be transmitted, and the light feedback region 211 that receives light fed back into the light incidence area 100 includes a feedback mirror 230. The light feedback region 211 has an angular range δ with the inner edge of the light feedback mirror 230 contacting the light scanning central axis 220. Meanwhile, a reenter mirror 110 is disposed adjacent to the light incidence path 101 in the light incidence area 100 so that the light fed back from the light reflection area 200 into the light incidence area 100 is reflected to the mirror m. An edge of the reenter mirror 110 contacts the light incidence path, thereby allowing the light emitted from the light source 300 to be incident on the reflection point P of the mirror m. If the mirror m is tilted at an angle between 0 and +δ, the light is reflected into the light output region 212 at an angle between 0 and +2δ with respect to the light scanning central axis 220. Conversely, if the mirror m is titled at angle between 0 and −δ, the incident is reflected into the light feedback region 211 at an angle between 0 and −2δ with respect to the light scanning central axis 220, reflected by the feedback mirror 230, and reflected by the reenter mirror 110 and the mirror m into the light output region 212 in the light reflection area 200 at an angle between 0 and +2δ with respect to the light scanning central axis 220.

Thus, together with the feedback mirror 230, the reenter mirror 110 reflects light toward a light output path that is symmetric to light propagation path in the light feedback region 211 about the light scanning central axis 220.

For example, as schematically shown in FIG. 3A, if the light along the light incidence path 101 is incident on the mirror m when the mirror m is titled at angle −δ, the light is reflected into the light reflection area 200 at an angle −2δ with respect to the light scanning central axis 220. The light is incident on the feedback mirror 230 and reflected toward the reenter mirror 110. The light is reflected off the reenter mirror 110 and the mirror m into the light output region 212 at an angle +2δ with respect to the light scanning central axis 220. Thus, the light scanning angle is reduced by 50% and the scanning frequency is doubled. That is, the optical scanning device of the present invention has the same scanning angular range as the rotational angular range of the mirror m, while its scanning frequency is double the driving frequency of the mirror m. The light can be fed back by the feedback mirror 230, as described above, if the feedback mirror 230 and the reenter mirror 110 are designed and arranged properly. According to this design, the feedback mirror 230 and the reenter mirror 110 are concave mirrors.

Where a laser beam is incident onto the surface of the mirror m at an angle θ (in radian), optical results for optical scanning method and device according to the present invention are summarized as follows:

a. When the mirror m is in its equilibrium position, the angle of reflection is 2 pi−θ;

b. When the mirror m is titled at an angle +δ, the angle of reflection is 2 pi−θ+2δ;

c. When the mirror m is titled at an angle −δ, the angle of reflection is 2 pi−θ−2δ; and d. To make the angle of reflection when the mirror m is titled at an angle −δ equal to that when the mirror m is titled at an angle +δ (that is, for symmetric mapping with respect to the angle of reflection when the mirror m is in its equilibrium position), the angle of incidence of the laser beam is θ−4δ.

The above design and arrangement of the feedback mirror 230 and the reenter mirror 110 may be obtained by algebraic calculations for given optical conditions or calculated by algorithm for geometrical-optical interpretation in an intuitive trial and error manner.

Figure 4B:
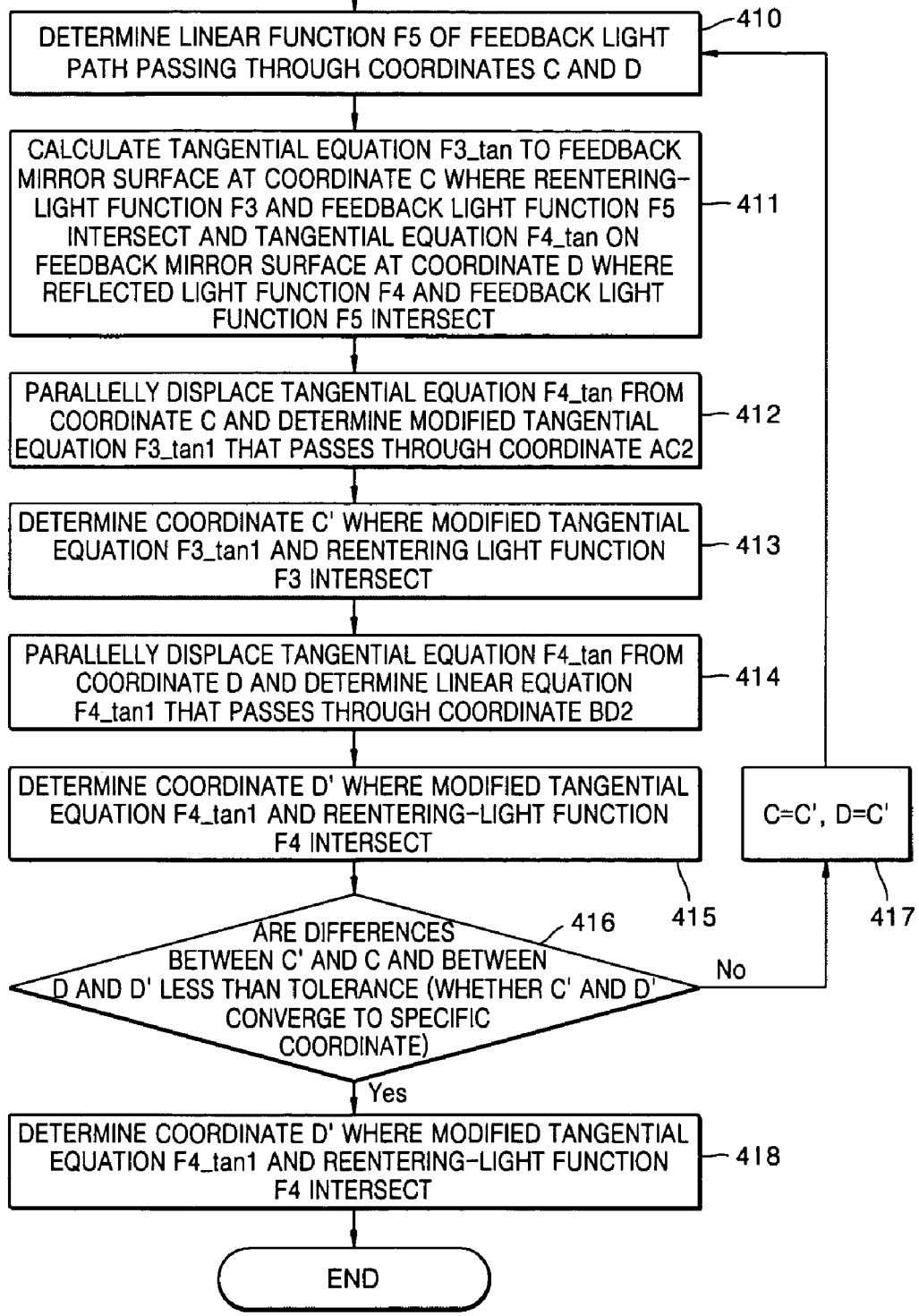
Figure 5:
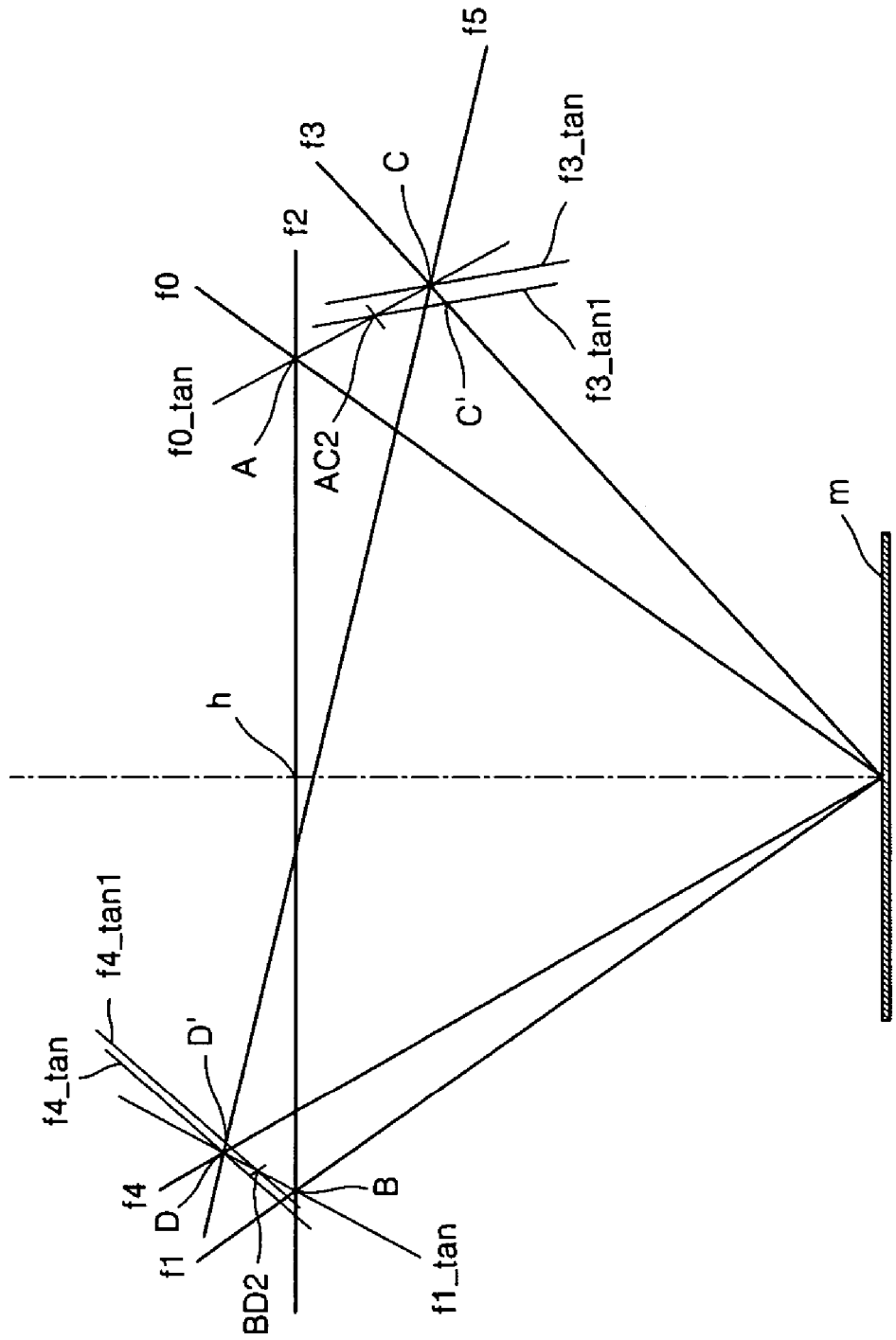
FIG. 5 is a diagram for aiding in the understanding of the algorithm of FIGS. 4A and 4B.
Figure 6:
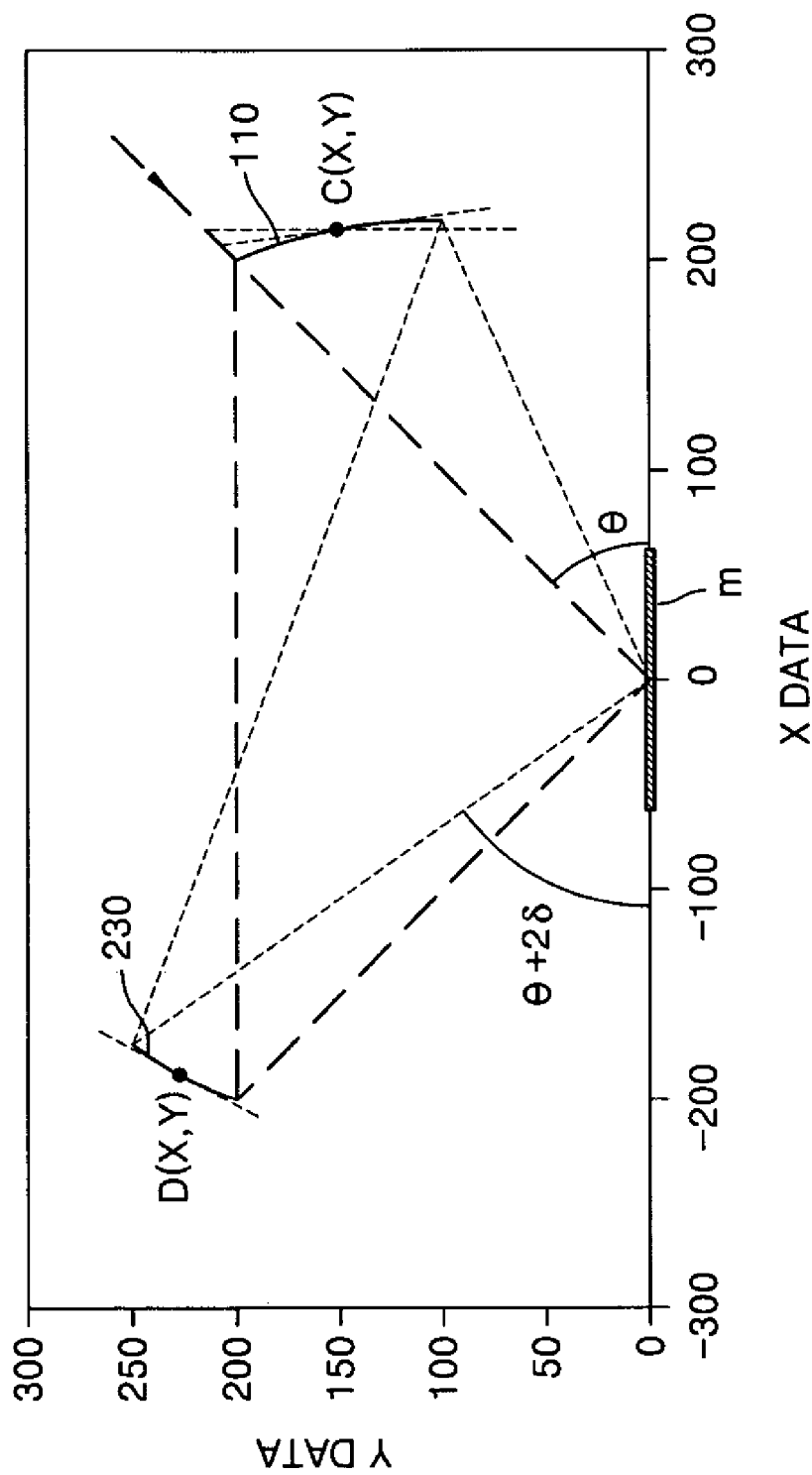
FIG. 6 shows the optical result obtained by the algorithm of FIG. 4.

An example of an algorithm for determining an optical design will now be described with reference to flowcharts of FIGS. 4A and 4B and optical diagram shown in FIG. 5.

Step 401:

Variables (optical design conditions) are defined, that is, optical conditions are set. The optical conditions include an angle θ of incidence of a beam onto the mirror m, an angle δ to which the mirror m oscillates, and a distance or height h between a point where a feedback path initiates and the surface of the mirror m when the mirror m is in its equilibrium position.

Step 402:

A function f0 of an incident-light path with respect to the above optical conditions and a function f1 of a reflected-light path when the angle δ is 0 is determined. In this case, the incident- and reflected-light path functions f0 and f1 are first-order functions that are symmetric about a y-axis that is a normal line passing through the reflection point P of the mirror m.

Step 403:

A first function f2 of a feedback light path when the angle δ of the mirror m is 0 is determined according to the height h.

Step 404:

A function f4 of a reflected-light path reflected from the mirror m and a corresponding function f3 of a reentering-light path reflected by the reenter mirror are determined when the angle of the mirror m is $-\delta$.

Step 405:

A coordinate A, which is a point where the feedback light path function f2 and the incident-light path function f0 intersect, and a tangential equation f0_tan for achieving a correct light feedback path passing through the coordinate A are determined. Thus, the tangential equation f0_tan should form the same included angle with respect to the functions f2 and f0.

Step 406:

A coordinate B, which is a point between the feedback light path function f2 and the reflected-light path function f1 intersect, and a tangential equation f1_tan for achieving a correct light feedback path passing through the coordinate B are determined. Thus, the tangential equation f1_tan should form the same included angle with the functions f1 or f2.

Step 407:

A coordinate C, which is a point where the tangential equation f0_tan and the reentering-light path function f3 intersect, is determined.

Step 408:

A coordinate D, which is a point where the tangential equation f1_tan and the reflected-light path function f4 intersect, is determined.

Step 409:

A coordinate AC2 and BD2 corresponding to midpoints between coordinates A and C and between coordinates B and D, respectively, are determined.

Step 410:

A second function f5 of a feedback light path that is a linear function connecting the coordinate C and D is determined.

Step 411:

A tangential equation f3_tan on a reflecting surface of the reenter mirror at the coordinate C and a tangential equation f4_tan for light reflection (feedback) at the coordinate D are determined. The tangential equation f3_tan intersects a point where the reentering-light path function f3 and the second feedback light path function f5 intersect. The tangential equation f4_tan intersect a point where the reflected-light path function f4 and the second feedback light path f5 intersect.

Step 412:

The tangential equation f3_tan on a surface of the reenter mirror at the coordinate C that is a light reflection point of the reenter mirror is displaced parallelly to generate a modified tangential equation f3_tan 1 that passes through the coordinate AC2.

Step 413:

A modified coordinate C' which is a point where the modified tangential equation f3_tan1 and the reentering-light path function f3 intersect is determined.

Step 414:

The tangential equation f4_tan on a mirror surface at the coordinate D is displaced parallel to generate a modified tangential equation f4_tan 1 that passes through the coordinate BD2.

Step 415:

A modified coordinate D', which is a point where the modified tangential equation f4_tan1 and the reflected-light path function f4 intersect is determined.

Step 416:

It is determined whether differences between the coordinates C' and C and the coordinates D and D' are less than a predetermined tolerance in order to determine whether the modified coordinates converge to specific coordinates. If there is convergence, step 418 is performed. Conversely, if there is no convergence, step 417 is performed.

Step 417:

If the modified coordinates C' and D' do not converge to specific coordinates, the coordinate C and D are replaced by the coordinate C' and D', respectively, and the process returns to the step 410.

Step 418:

If the modified coordinates C' and D' converge to specific coordinates, the modified coordinates C' and D' are determined as coordinates on a mirror surface for reentry and feedback of light at a given mirror driving angle.

The above operation process is performed at regular angular intervals within a given driving range. The entire data for feedback mirror and reenter mirror can be obtained by repeated operations. Data for an interim angle not calculated can be obtained from previously or next calculated data by calculated interpolation.

Table 1 below shows mirror data obtained by employing the algorithm described above and a light feedback structure constructed based on the obtained data. That is, the angle of incidence $\theta$ is 45 degrees, the distance from the mirror to the point where the light is fed back is 200 mm, and the driving angle $\delta$ of the mirror ranges from 0 to 0.2 degrees. Table 1 shows x and y components C.x, C.y, D.x, and D.y of coordinates C and D of feedback mirror F and reenter mirror R, respectively, according to the driving angle m.angle and slopes f3_tan_ang, f4_tan_ang on a mirror surface at the appropriate coordinates. Here, iter# denotes the number of repetitions of steps 410–416.

TABLE 1

| delta | C.x | C.y | D.x | D.y | f3_tan_ang | f4_tan_ang | iter# |
|---|---|---|---|---|---|---|---|
| 0.00000 | 200.00000 | 200.00000 | −200.00000 | 200.00000 | −67.50000 | 67.50000 | 1 |
| 0.02500 | 200.20396 | 199.50634 | −199.89758 | 200.24678 | −67.60302 | 67.42198 | 2 |
| 0.05000 | 200.40689 | 199.01265 | −199.79482 | 200.49345 | −67.70600 | 67.34400 | 2 |
| 0.07500 | 200.60879 | 198.51895 | −199.69170 | 200.74003 | −67.80895 | 67.26605 | 3 |
| 0.10000 | 200.80966 | 198.02523 | −199.58823 | 200.98651 | −67.91187 | 67.18813 | 3 |
| 0.12500 | 201.00950 | 197.53149 | −199.48441 | 201.23288 | −68.01476 | 67.11024 | 3 |
| 0.15000 | 201.20831 | 197.03773 | −199.38024 | 201.47916 | −68.11761 | 67.03239 | 3 |
| 0.17500 | 201.40608 | 196.54396 | −199.27572 | 201.72533 | −68.22044 | 66.95456 | 3 |
| 0.20000 | 201.60283 | 196.05018 | −199.17086 | 201.97140 | −68.32323 | 66.87677 | 3 |
| 0.22500 | 201.79854 | 195.55639 | −199.06564 | 202.21738 | −68.42599 | 66.79901 | 3 |
| 0.25000 | 201.99322 | 195.06258 | −198.96008 | 202.46325 | −68.52871 | 66.72129 | 3 |

TABLE 1-continued

| delta | C.x | C.y | D.x | D.y | f3_tan_ang | f4_tan_ang | iter# |
|---|---|---|---|---|---|---|---|
| 0.27500 | 202.18687 | 194.56877 | −198.85417 | 202.70902 | −68.63141 | 66.64359 | 3 |
| 0.30000 | 202.37949 | 194.07495 | −198.74791 | 202.95469 | −68.73407 | 66.56593 | 3 |
| 0.32500 | 202.57107 | 193.58112 | −198.64131 | 203.20025 | −68.83671 | 66.48829 | 3 |
| 0.35000 | 202.76163 | 193.08729 | −198.53436 | 203.44572 | −68.93931 | 66.41069 | 3 |
| 0.37500 | 202.95115 | 192.59345 | −198.42707 | 203.69108 | −69.04188 | 66.33312 | 3 |
| 0.40000 | 203.13965 | 192.09962 | −198.31943 | 203.93635 | −69.14442 | 66.25558 | 3 |
| 0.42500 | 203.32711 | 191.60578 | −198.21145 | 204.18151 | −69.24693 | 66.17807 | 3 |
| 0.45000 | 203.51354 | 191.11194 | −198.10313 | 204.42657 | −69.34940 | 66.10060 | 3 |
| 0.47500 | 203.69894 | 190.61810 | −197.99446 | 204.67152 | −69.45185 | 66.02315 | 4 |
| 0.50000 | 203.88331 | 190.12426 | −197.88545 | 204.91638 | −69.55427 | 65.94574 | 4 |
| 0.52500 | 204.06665 | 189.63043 | −197.77610 | 205.16113 | −69.65665 | 65.86835 | 4 |
| 0.55000 | 204.24895 | 189.13661 | −197.66640 | 205.40578 | −69.75901 | 65.79099 | 4 |
| 0.57500 | 204.43023 | 188.64279 | −197.55637 | 205.65033 | −69.86133 | 65.71367 | 4 |
| 0.60000 | 204.61048 | 188.14898 | −197.44599 | 205.89478 | −69.96363 | 65.63637 | 4 |
| 0.62500 | 204.78969 | 187.65518 | −197.33528 | 206.13912 | −70.06569 | 65.55911 | 4 |
| 0.65000 | 204.96788 | 187.16139 | −197.22422 | 206.38336 | −70.16813 | 65.48187 | 4 |
| 0.67500 | 205.14503 | 186.66762 | −197.11283 | 206.62750 | −70.27033 | 65.40467 | 4 |
| 0.70000 | 205.32116 | 186.17386 | −197.00110 | 206.87154 | −70.37251 | 65.32749 | 4 |
| 0.72500 | 205.49625 | 185.68011 | −196.88903 | 207.11547 | −70.47465 | 65.25035 | 4 |
| 0.75000 | 205.67032 | 185.18639 | −196.77663 | 207.35930 | −70.57677 | 65.17323 | 4 |
| 0.77500 | 205.84335 | 184.69268 | −196.66388 | 207.60302 | −70.67885 | 65.09615 | 4 |
| 0.80000 | 206.01536 | 184.19899 | −196.55080 | 207.84665 | −70.78091 | 65.01909 | 4 |
| 0.82500 | 206.18634 | 183.70532 | −196.43739 | 208.09017 | −70.88294 | 64.94206 | 4 |
| 0.85000 | 206.35628 | 183.21168 | −196.32364 | 208.33358 | −70.98494 | 64.86506 | 4 |
| 0.87500 | 206.52520 | 182.71807 | −196.20955 | 208.57690 | −71.08690 | 64.78810 | 4 |
| 0.90000 | 206.69309 | 182.22447 | −196.09513 | 208.82011 | −71.18884 | 64.71116 | 4 |
| 0.92500 | 206.85996 | 181.73091 | −195.98038 | 209.06322 | −71.29076 | 64.63424 | 4 |
| 0.95000 | 207.02579 | 181.23738 | −195.86530 | 209.30622 | −71.39264 | 64.55736 | 4 |
| 0.97500 | 207.19060 | 180.74388 | −195.74988 | 209.54912 | −71.49449 | 64.48051 | 4 |
| 1.00000 | 207.35437 | 180.25041 | −195.63413 | 209.79191 | −71.59631 | 64.40369 | 4 |
| 1.02500 | 207.51712 | 179.75697 | −195.51804 | 210.03461 | −71.69811 | 64.32689 | 4 |
| 1.05000 | 207.67885 | 179.26357 | −195.40163 | 210.27720 | −71.79988 | 64.25012 | 4 |
| 1.07500 | 207.83954 | 178.77021 | −195.28488 | 210.51968 | −71.90162 | 64.17338 | 4 |
| 1.10000 | 207.99921 | 178.27689 | −195.16781 | 210.76206 | −72.00333 | 64.09667 | 4 |
| 1.12500 | 208.15786 | 177.78360 | −195.05040 | 211.00434 | −72.10501 | 64.01999 | 4 |
| 1.15000 | 208.31547 | 177.29036 | −194.93267 | 211.24651 | −72.20666 | 63.94334 | 4 |
| 1.17500 | 208.47207 | 176.79717 | −194.81461 | 211.48858 | −72.30829 | 63.86671 | 4 |

The present invention employs an external optical feedback structure in addition to a scanner equipped with a mirror, thus providing a method and apparatus that reduce a scanning angle by half compared to a conventional scanner by projecting half the scanning angle into the other half of the scanning angle while doubling scanning rate (scanning frequency).

In the apparatus according to exemplary embodiments of the present invention, the frequency of a scanner is doubled by the use of a feedback mirror and a reenter mirror, thus overcoming difficulties in high-frequency scanning that current scanners have employing a separate optical feedback structure. The apparatus doubles the frequency given by the physical structure of the scanner.

The doubled frequency is suitable for laser televisions, and in particular, for high resolution and high quality laser projection-type image display devices. The present invention will not only lead to progress in technology but also can improve the overall performance of a system with a low performance device in order to offer fast time-to-market and realize a ultrahigh performance system that overcomes the restrictions on existing device performance.

While the present invention has been particularly shown and described with reference to preferred embodiments thereof, the embodiments should not be construed to limit the present invention but in a generic and descriptive sense. Thus, it will be understood by those skilled in the art that various changes in form and details may be made therein without departing from the spirit and scope of the invention as defined by the appended claims.

What is claimed is:

1. A method of doubling an optical scanning frequency, comprising:

disposing a mirror with a reflection point in an equilibrium position such that a line passing through the reflection point and orthogonal to a direction of the mirror in the equilibrium state divides a region into a light incidence area and a light reflection area;

emitting light from the light incidence area toward the reflection point of the mirror along a light incidence path at an angle θ to the mirror's equilibrium position;

oscillating the mirror about the equilibrium position between angles $-\delta_1$ and $+\delta_2$ at a predetermined frequency and scanning through reflection the incident light into a light scanning area of the light reflection area with an angular range corresponding to $\delta_1$ and $\delta_2$, the light scanning area being divided into a feedback scanning region and an output scanning region;

feeding the light that enters the feedback scanning region directly back into the vicinity of the light incidence path of the light incidence area; and reflecting the light fed back into the light incidence area toward the reflection point of the mirror and scanning through reflection the reentered light into the output scanning region.

2. The method of claim 1, wherein the feedback scanning region and output scanning region have equal angular ranges and are symmetric about a central light scanning axis.

3. The method of claim 1, wherein the angle of incidence of light reflected toward the mirror in the equilibrium state by a reenter mirror $\theta-4\delta$.

4. The method of claim 2, wherein the angle of incidence of light reflected toward the mirror in the equilibrium state by a reenter mirror is $\theta-4\delta$.

5. An optical scanning device comprising:
a scanning mirror that oscillates from its equilibrium position about a reflection point at a predetermined frequency in an angular range between $-\delta_1$ and $+\delta_2$ with respect to the equilibrium position of the mirror, wherein the scanning mirror in the equilibrium position divides a region into a light incidence area and a light reflection area;
a feedback mirror that reflects light, that is emitted along a light incidence path at an angle $\theta$ and reflected by the reflection point of the scanning mirror into a light feedback region of a light scanning area, directly toward the vicinity of the light incidence path of a light incidence area; and
a reenter mirror that reflects the light reflected by the feedback mirror to the reflection point of the scanning mirror such that the light is scanned onto an output scanning region,
wherein the light incidence area and the light reflection area are separated by a line passing through the reflection point and orthogonal to the equilibrium position of the scanning mirror, and the light scanning area is divided into the feedback scanning region and the output scanning region.

6. The device of claim 5, wherein the feedback scanning region and output scanning region of the light reflection area have equal angular ranges and are symmetric about a central light scanning axis.

7. The device of claim 5, wherein the reenter mirror is a concave mirror having a size to reflect all of the light reflected by the feedback mirror and reflecting the light reflected from the feedback mirror toward the reflection point.

8. The device of claim 5, wherein the feedback mirror is a concave mirror that has a size corresponding to the feedback scanning region and reflects the light incident from the scanning mirror toward the reenter mirror.

9. The device of claim 5, wherein the angle of incidence of light reflected toward the scanning mirror in the equilibrium state by a reenter mirror $\theta-4\delta$.

10. The device of claim 6, wherein the angle of incidence of light reflected toward the scanning mirror in the equilibrium state by a reenter mirror $\theta-4\delta$.

11. The device of claim 7, wherein the angle of incidence of light reflected toward the scanning mirror in the equilibrium state by a reenter mirror $\theta-4\delta$.

12. The device of claim 8, wherein the angle of incidence of light reflected toward the mirror in the equilibrium state by a reenter mirror $\theta-4\delta$.

13. A method of doubling an optical scanning frequency, comprising:
disposing a mirror with a reflection point in an equilibrium position such that a line passing through the reflection point and orthogonal to a direction of the mirror in the equilibrium state divides a region into light incidence area and a light reflection area;
emitting light from the light incidence area toward the reflection point of the mirror along a light incidence path at an angle $\theta$ to the mirror's equilibrium position;
oscillating the about the equilibrium position between angles $-\delta_1$ and $+\delta_2$ at a predetermined frequency and scanning through of the incidence light into a light scanning area of the light reflection area with an angular range corresponding to $\delta_1$ and $\delta_2$, the light scanning area being divided into a feedback scanning region and an output scanning region;
feeding the light that enters the feedback scanning region back into the vicinity of the light incidence path of the light incidence area; and
reflecting the light fed back into the light incidence area toward the reflection point of the mirror and scanning through reflection of the reentered light into the output scanning region,
wherein an angle of incidence of light reflected toward the mirror in the equilibrium state by a reenter mirror is $\theta-4\delta$.

14. The method of claim 13, wherein the feedback scanning region and output scanning region have equal angular ranges and are symmetric about a central light scanning axis.

15. An optical scanning device comprising:
a scanning mirror that oscillates from its equilibrium position about a reflection point at a predetermined frequency in an angular range between $-\delta_1$ and $+\delta_2$ with respect to the equilibrium position of the mirror, wherein the scanning mirror in the equilibrium position divides a region into a light incidence area and a light reflection area;
a feedback mirror that reflects light that is emitted along a light incidence path at an angle $\theta$ and reflected by the reflection point of the scanning mirror into a light feedback region of a light scanning area, toward the vicinity of the light incidence path of the light incidence area; and
a reenter mirror that reflects the light reflected by the feedback mirror to the reflection point of the scanning mirror such that the light is scanned onto an output scanning region,
wherein the light incidence area and the light reflection area are separated by a line passing through the reflection point and orthogonal to the equilibrium position of the scanning mirror, and the light scanning area is divided into the feedback scanning region and the output scanning region, and wherein an angle of incidence of light reflected toward the scanning mirror in the equilibrium state by the reenter mirror is $\theta-4\delta$.

16. The device of claim 15, wherein the feedback scanning region and output scanning region of the light reflection area have equal angular ranges and are symmetric about a central light scanning axis.

17. The device of claim 15, wherein the reenter mirror is a concave mirror having a size to reflect all of the light reflected by the feedback mirror and reflecting the light reflected from the feedback mirror toward the reflection point.

18. The device of claim 15, wherein the feedback mirror is a concave mirror that has a size corresponding to the feedback scanning region and reflects the light incident from the scanning mirror toward the reenter mirror.

* * * * *